US010921511B1

(12) United States Patent
Duce et al.

(10) Patent No.: US 10,921,511 B1
(45) Date of Patent: Feb. 16, 2021

(54) FLOOR LIGHTING ASSEMBLY

(71) Applicant: THE BOEING COMPANY, Chicago, IL (US)

(72) Inventors: Jeffrey Lynn Duce, Maple Valley, WA (US); Karen L. Hills, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/563,360

(22) Filed: Sep. 6, 2019

(51) Int. Cl.
| B64C 1/18 | (2006.01) |
| F21V 8/00 | (2006.01) |
| B64D 11/00 | (2006.01) |
| E04B 5/46 | (2006.01) |
| B60Q 3/78 | (2017.01) |
| B60Q 3/20 | (2017.01) |
| F21V 23/04 | (2006.01) |
| F21W 106/00 | (2018.01) |

(52) U.S. Cl.
CPC ............ *G02B 6/0095* (2013.01); *B60Q 3/20* (2017.02); *B60Q 3/78* (2017.02); *B64D 11/00* (2013.01); *E04B 5/46* (2013.01); *F21V 23/0471* (2013.01); *G02B 6/0035* (2013.01); *G02B 6/0055* (2013.01); *G02B 6/0068* (2013.01); *G02B 6/0083* (2013.01); *B64D 2011/0038* (2013.01); *F21W 2106/00* (2018.01)

(58) Field of Classification Search
None
See application file for complete search history.

(56) References Cited

U.S. PATENT DOCUMENTS

| 6,942,374 B2* | 9/2005 | Lee ..................... G02B 6/002 362/561 |
| 7,364,341 B2* | 4/2008 | Parker ................ G02B 6/0053 362/620 |
| 7,866,871 B2* | 1/2011 | Couzin ................ G02B 5/021 362/330 |
| 7,876,489 B2* | 1/2011 | Gandhi ............... G02B 6/0035 359/242 |
| 8,262,274 B2* | 9/2012 | Kim ................... G02B 6/0018 349/62 |
| 8,475,026 B2* | 7/2013 | Van Herpen .......... D05C 17/02 362/153 |
| 8,858,055 B2* | 10/2014 | Gu ....................... G09F 13/04 362/613 |
| 9,052,431 B2* | 6/2015 | Que ..................... G02B 6/0088 |

(Continued)

*Primary Examiner* — Elmito Breval
(74) *Attorney, Agent, or Firm* — Philip S. Hof; The Small Patent Law Group, LLC (57) ABSTRACT

A floor lighting assembly includes a luminous composite sheet and a light transmissive carpet. The luminous composite sheet has a top side, a bottom side, and an edge extending from the top side to the bottom side. The light sources are arranged in a row and are configured to emit light into the light guide film through the edge. The light transmissive carpet is disposed above the top side of the light guide film. The light transmissive carpet includes a backing structure and a pile mounted to and extending from the backing structure. The light guide film is configured to spread and redirect the light that is received therein through the edge for emitting the light through the top side of the light guide film such that some of the light is transmitted through the light transmissive carpet.

20 Claims, 3 Drawing Sheets

(56) References Cited

U.S. PATENT DOCUMENTS

| | | | | |
|---|---|---|---|---|
| 10,132,989 B2 * | 11/2018 | Zhou | ................... | G02F 1/1335 |
| 2011/0085107 A1 * | 4/2011 | Noh | ................... | G02B 6/0081 |
| | | | | 349/61 |
| 2011/0110091 A1 * | 5/2011 | Van Herpen | ........ | F21V 19/0005 |
| | | | | 362/249.14 |
| 2011/0203147 A1 * | 8/2011 | Van Herpen | ............. | B60Q 3/46 |
| | | | | 40/541 |
| 2011/0285296 A1 * | 11/2011 | VanHerpen | .......... | D06N 7/0073 |
| | | | | 315/159 |
| 2012/0015157 A1 * | 1/2012 | Chen | ...................... | H04M 1/22 |
| | | | | 428/195.1 |
| 2012/0268687 A1 * | 10/2012 | Kaida | .................... | B32B 27/08 |
| | | | | 349/61 |
| 2014/0111862 A1 * | 4/2014 | Yamamoto | .............. | B32B 3/266 |
| | | | | 359/599 |
| 2016/0282978 A1 * | 9/2016 | Wang | ................... | B32B 27/365 |
| 2018/0208111 A1 * | 7/2018 | Lisseman | ............. | G02B 6/0055 |
| 2018/0306730 A1 * | 10/2018 | Xu | .......................... | E04F 15/02 |
| 2020/0079050 A1 * | 3/2020 | Hattori | .................. | G01D 11/28 |

\* cited by examiner

FLOOR LIGHTING ASSEMBLY

FIELD

Embodiments of the present disclosure generally relate to illuminating the floors of interior spaces, such as, for example, passenger cabins within commercial aircraft, and more particularly to luminous composite sheets.

BACKGROUND

Aisles in dimly lit interior spaces of commercial buildings and vehicles may be illuminated to provide wayfinding. These interior spaces may be intentionally dim to allow passengers to sleep at night, to watch movies, and the like. When the passenger cabins of commercial passenger aircraft, buses, train cars, and the like are dim, the aisles may be illuminated to enable passengers to find their assigned seats. Lighting the aisles also enables both passengers and employees walking through the aisles to see objects, such as feet, purses, backpacks, and the like, within the aisles that could pose tripping hazards if unnoticed.

Known systems for illuminating aisles may be complex, inefficient, expensive, and/or excessively bright. For example, one known system installs downward-facing lights on passenger seats adjacent to the aisle to illuminate the aisle. But, integrating the lights, circuitry, and power components for powering the lights into the seats may be complex and expensive. Another known system is to install LED light strips directly on the floor. The LEDs in the light strips are directly visible and the intensity of the light emitted by the LEDs may disturb some passengers that are trying to sleep, watch a movie, or the like. Furthermore, the light strips may form raised ridges along the floor, even when placed underneath a carpet, and the raised ridges may interfere with walking down the aisle and/or pushing a cart down the aisle.

SUMMARY

A need exists for a lighting assembly that can efficiently and effectively illuminate an aisle within a dim interior space without disturbing passengers due to the intensity of the light or causing bumps, ridges, or grooves along the floor.

With those needs in mind, certain embodiments of the present disclosure provide a floor lighting assembly, such as within an interior cabin of a vehicle. The floor lighting assembly includes a luminous composite sheet and a light transmissive carpet. The luminous composite sheet includes a light guide film and a plurality of light sources. The light guide film has a top side, a bottom side opposite the top side, and an edge extending from the top side to the bottom side. The light sources are arranged in a row at or proximate to the edge of the light guide film. The light sources are configured to emit light into the light guide film through the edge. The light transmissive carpet is disposed above the top side of the light guide film. The light transmissive carpet includes a backing structure and a pile mounted to and extending from the backing structure. The light guide film is configured to spread and redirect the light that is received therein through the edge for emitting the light through the top side of the light guide film such that some of the light is transmitted through the light transmissive carpet.

Certain embodiments of the present disclosure provide a method of producing a floor lighting assembly. The method includes providing a light guide film having a top side, a bottom side opposite the top side, and an edge extending from the top side to the bottom side. The method includes assembling a plurality of light sources in a row at or proximate to the edge of the light guide film. The light sources are spaced apart along a length of the light guide film and are oriented to emit light into the light guide film through the edge. The method also includes installing a light transmissive carpet above the top side of the light guide film. The light transmissive carpet includes a backing structure and a pile mounted to and extending from the backing structure. The light guide film is configured to spread and redirect the light that is received therein through the edge for emitting the light through the top side of the light guide film such that some of the light is transmitted through the light transmissive carpet.

Certain embodiments of the present disclosure provide a floor lighting assembly that includes a luminous composite sheet and a light transmissive carpet. The luminous composite sheet includes a light guide film, a substrate, a plurality of light sources, and a laminate coating. The light guide film has a top side, a bottom side opposite the top side, and an edge extending from the top side to the bottom side. The substrate is positioned adjacent to the edge of the light guide film. The light sources are mounted on the substrate and arranged in a row along the edge of the light guide film. The light sources are configured to emit light into the light guide film through the edge. The laminate coating covers a top side of the substrate and the top side of the light guide film. A top surface of the laminate coating is planar. The light transmissive carpet is disposed on the top surface of the laminate coating. The light transmissive carpet includes a backing structure and a pile mounted to and extending from the backing structure. The light guide film is configured to spread and redirect the light that is received therein through the edge for emitting the light through the top side of the light guide film such that some of the light is transmitted through the laminate coating and the light transmissive carpet.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein.

DETAILED DESCRIPTION

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a scalable floor lighting assembly for use within interior spaces, such as commercial buildings and commercial vehicles. Commercial buildings that may utilize the floor lighting assembly include movie theaters, office buildings, factories, and the like. Commercial vehicles that may utilize the floor lighting assembly include aircraft, trains, buses, marine vessels, and the like. The floor lighting assembly may be flexible to enable rolling the lighting assembly on a spool. The lighting assembly may able to be unrolled to provide a desired length of the floor lighting assembly, such that a single discrete lighting assembly may be able to continuously extend for an entire length of an aisle. Optionally, multiple panels or lengths of the lighting assembly may be mechanically and/or electrically connected together to enlarge the area of the floor lighting assembly along the aisle. An aisle as referred to herein is a path or walkway. The aisle may be disposed between two sections of seats, where each section includes multiple rows of seats, such as in commercial passenger vehicles and movie theaters. The aisles referred to herein may also include walkways that are not disposed between sections of seats, such as aisles through cubicles of an office.

The floor lighting assembly according to the embodiments disclosed herein create lighting effects which cause a light transmissive carpet to have a diffuse glow. For example, some light is emitted through the carpet, but the intensity of the light is sufficiently low to avoid disturbing people in the dimly-lit space who are sleeping, watching a movie, or the like. However, the light through the carpet is sufficiently bright and is spread over a sufficiently large area of the aisle that any objects disposed on the carpet, such as bags, feet, and the like, may be sufficiently illuminated to enable a person walking along the aisle to detect the presence of the objects and avoid tripping or stepping on the objects. The lighting assembly is configured to spread and diffuse light laterally such that an area of the carpet effectively glows with controlled light properties (e.g., intensity, wavelength, and the like). Objects on the carpet may be viewed from a person walking along the aisle in the dimly-lit space as dark shapes or shadows surrounded by glowing areas of the carpet.

The floor lighting assembly includes a luminous composite sheet and a light transmissive carpet. The luminous composite sheet is disposed underneath the light transmissive carpet such that the carpet defines the user-facing side of the floor lighting assembly. The luminous composite sheet generates light and the light transmissive carpet is configured to allow at least some light to penetrate through the carpet to create the lighting effects described above. Optionally, the luminous composite sheet may be adhered to the light transmissive carpet prior to installation along an aisle. For example, the luminous composite sheet may define a backing layer of the light transmissive carpet.

Figure 1:
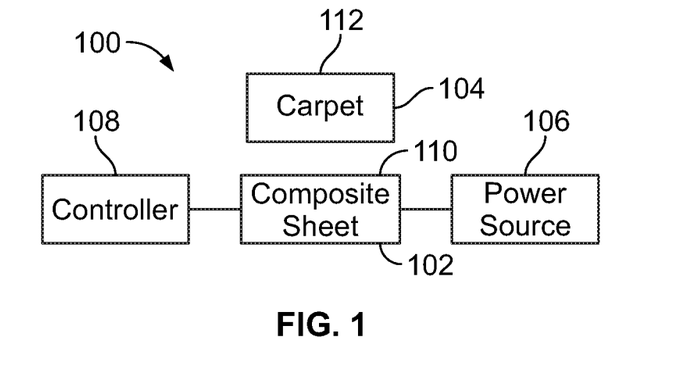
FIG. 1 is a schematic block diagram of a floor lighting assembly according to an embodiment of the present disclosure.

FIG. 1 is a schematic block diagram of a floor lighting assembly 100 according to an embodiment of the present disclosure. The floor lighting assembly 100 includes a luminous composite sheet 102 and a light transmissive carpet 104. The floor lighting assembly 100 is configured to be installed within an interior space of a building or vehicle, such as an aircraft. Optionally, the luminous composite sheet 102 (also referred to herein as composite sheet 102) may be elongated and rolled up on a spool prior to installation within the interior space, such that the composite sheet 102 is installed in part by unrolling a length of the composite sheet 102. The composite sheet 102 may be mechanically and/or electrically couplable to other composite sheets 102 to provide a modular floor lighting assembly 100 along a greater area of the interior space.

The composite sheet 102 is electrically connected to an electrical power source 106 that supplies electrical power (e.g., electric current) for powering the composite sheet 102 to generate light. Optionally, the electrical power source 106 may be disposed on the composite sheet 102. For example, the power source 106 may include or represent an electrical storage device, such as one or more batteries, capacitors, or the like. Optionally, the composite sheet 102 may include one or more piezoelectric elements that are configured to charge the electrical storage device based on compressive forces exerted on the piezoelectric elements as people walk on the floor lighting assembly 100. In another example, the power source 106 may be a remote power source, such as a power outlet installed within the building or vehicle. The composite sheet 102 may include an electrical connector that couples directly or indirectly to the power outlet. For example, a single remote electrical power source 106, such as a single power outlet, may be utilized to electrically power a series of multiple composite sheets 102 that are connected to one another in a daisy chain arrangement. The composite sheet 102 may be connected to the power source 106 via a conductive pathway, such as a wire or a metal trace.

The composite sheet 102 may also be operably connected to a controller 108. The controller 108 may be configured to control the operation of light sources 202 (shown in FIG. 2) of the composite sheet 102. For example, the controller 108 may control characteristics or properties of the light emitted by the light sources 202, such as wavelength (e.g., color), intensity, activation and deactivation of each of the light sources 202, and the like. The controller 108 includes one or more processors. The controller 108 may be disposed on the composite sheet 102 or remote from the composite sheet 102 and connected to the composite sheet 102 via a wired or wireless communication link. The controller 108 is configured to operate based on designated sets of instructions. The controller 108 is configured to execute a set of instructions stored in one or more data storage units or elements (such as one or more memories included within or connected to the controller 108). The set of instructions may include various commands that instruct the controller 108 as a processing machine to perform specific operations. The set of instructions may be in the form of one or more software programs. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine. The controller 108 may be configured to control the light sources 202 of multiple different composite sheets 102, or the floor lighting assembly 100 may include multiple controllers 108 that are configured to control the light sources 202 of the different composite sheets 102.

The light transmitting carpet 104 (also referred to herein as carpet 104) is disposed on a user-facing side 110 of the composite sheet 102. The composite sheet 102 is configured to emit light from the user-facing side 110, and at least some of that light penetrates through the carpet 104 for providing the lighting effects to people above a user-facing side 112 of the carpet 104. For example, the lighting effect may make an area of the carpet 104 appear to have a relatively uniform glow.

Figure 2:
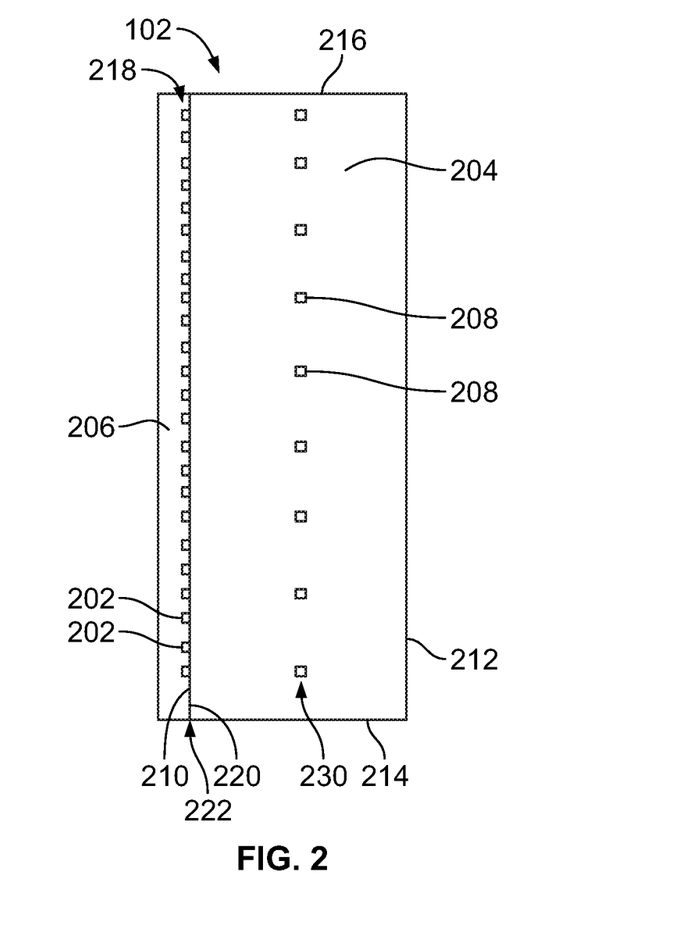
FIG. 2 is a schematic illustration of a luminous composite sheet of the floor lighting assembly according to an embodiment of the present disclosure.

FIG. 2 is a schematic illustration of the luminous composite sheet 102 of the floor lighting assembly 100 according to an embodiment of the present disclosure. The composite sheet 102 in the illustrated embodiment includes a plurality of light sources 202, a light guide film 204, a substrate 206, and a plurality of pressure sensors 208. The schematic illustration shown in FIG. 2 may generally represent a top-down view of the user-facing side 110 shown in FIG. 1 or a bottom-up view of the composite sheet 102, although the illustration is merely to indicate potential arrangements of components rather than depict the actual appearance of the composite sheet 102.

The light guide film 204 is a thin, flat structure that is translucent or transparent. The light guide film 204 is configured to receive light into an interior of the film 204 and redirect and emit the light in a controlled manner as described herein. The light guide film 204 includes a first edge 210, a second edge 212, a third edge 214, and a fourth edge 216. The second edge 212 is opposite the first edge 210. The third and fourth edges 214, 216 both extend from the first edge 210 to the second edge 212. The fourth edge 216 is opposite the third edge 214. Each of the first and second edges 210, 212 extend a length from the third edge 214 to the fourth edge 216. In the illustrated embodiment, the light guide film 204 is rectangular, and the first and second edges 210, 212 are longer than the third and fourth edges 214, 216. In an alternative embodiment, the first and second edges 210, 212 may be shorter than, or the same length as, the third and fourth edges 214, 216.

The light sources 202 are arranged in a row 218 at or proximate to the first edge 210 of the light guide film 204. The first edge 210 of the light guide film 204 may also be referred to herein simply as the edge 210. The light sources 202 are spaced apart from each other along the length of the edge 210. The light sources 202 may be evenly spaced apart such that the pitch or spacing between adjacent light sources 202 is uniform or constant along the length of the row 218. The light sources 202 are not mounted to the light guide film 204, but rather are mounted to the substrate 206. The light sources 202 may be light emitting diodes (LEDs), such as organic light-emitting diodes (OLEDs) or LEDs made from inorganic semiconductor materials.

The substrate 206 is adjacent to the edge 210 and is elongated to extend along the length of the edge 210. In the illustrated embodiment, the substrate 206 has the same length as the edge 210 and has a narrower width than the light guide film 204. For example, the substrate 206 may be a narrow strip of a relatively rigid or flexible substrate. The light sources 202 are mounted to the substrate 206 along an edge 220 of the substrate 206 that faces the edge 210 of the light guide film 204. The edge 220 of the substrate 206 is also referred to herein as a light edge 220. The light edge 220 and the edge 210 define an interface 222 between the substrate 206 and the light guide film 204. The light edge 220 may abut the edge 210 at the interface 222 or, alternatively, may be spaced apart from each other by a thin layer of light transmissive material, such as a clear epoxy. As described herein, the light sources 202 are configured to emit light across the interface 222 such that the light enters the interior of the light guide film 204 through the edge 210.

In one or more embodiments, the substrate 206 is secured in a fixed position relative to the light guide film 204 to maintain the positioning of the substrate 206 to the light guide film 204 as shown in FIG. 2. For example, the substrate 206 and the light guide film 204 may be secured together via an application of a laminate coating 302 (shown in FIG. 3). The laminate coating 302 may represent a polymer that covers or encapsulates the substrate 206 and light guide film 204 in a fluid state and subsequently hardens to hold the positioning of the substrate 206 and film 204. Alternatively, the laminate coating 302 may represent a heat shrink material. Optionally, the substrate 206 may be fastened to the light guide film 204 via one or more fasteners (e.g., bolts, screws, clamps, or the like) and/or adhered to the light guide film 204 via an adhesive at or across the interface 222.

The pressure sensors 208 are spaced apart along the length of the edge 210. The pressure sensors 208 may be arranged in at least one row 230. In the illustrated embodiment, the pressure sensors 208 are arranged in a single row 230 that is at or proximate to a centerline of the light guide film 204 between the first and second edges 210, 212. The pressure sensors 208 are configured to generate pressure signals based on compressive forces experienced by the pressure sensors 208. For example, as a weighted body steps or lands on the composite sheet 102, one or more of the pressure sensors 208 proximate to the point of impact of the body on the composite sheet 102 may generate a pressure signal that indicates an amount of force experienced by the respective pressure sensors 208 attributable to the body. The pressure sensors 208 may include or represent piezoelectric elements that generate or modify an electrical resistance proportional to an amount of force experienced. The pressure sensors 208 are operably coupled to the controller 108 (shown in FIG. 1) via a wired or wireless communication link. In an alternative embodiment, the pressure sensors 208 may be arranged in multiple parallel rows 230 instead of the single row 230 down the center of the light guide film 204.

Figure 3:
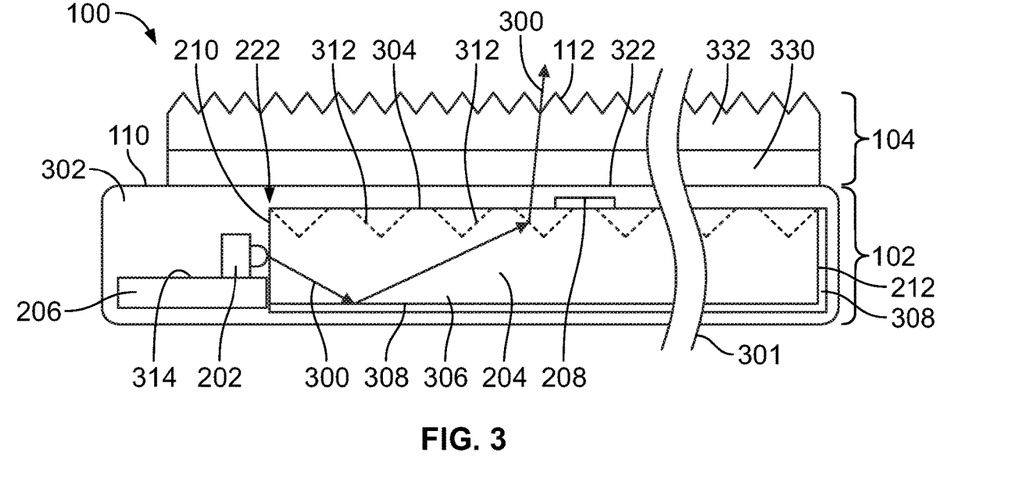
FIG. 3 is a cross-sectional view of the floor lighting assembly according to an embodiment of the present disclosure.

FIG. 3 is a cross-sectional view of the floor lighting assembly 100 according to an embodiment. The light transmissive carpet 104 is disposed on the user-facing side 110 of the composite sheet 102. FIG. 3 shows one of the light sources 202 emitting a ray or beam 300 of light into the light guide film 204 through the edge 210 of the light guide film 204. The light guide film 204 is configured to redirect the beam 300 to emit the beam 300 towards the light transmissive carpet 104 for illuminating the carpet 104, as described herein.

The illustrated view shows both the first edge 210 and the second edge 212 of the light guide film 204 because the floor lighting assembly 100 is shortened in the lateral or width direction as indicated by the cut lines 301. The light guide film 204 has a top side 304 and a bottom side 306 opposite the top side 304. The first and second edges 210, 212 both extend from the top side 304 to the bottom side 306. The dimensions of the light guide film 204, such as thickness in a vertical dimension from the top side 304 to the bottom side 306, width from the first edge 210 to the second edge 212, and/or length from the third edge 214 to the fourth edge 216 (both shown in FIG. 2) may be selected based on application-specific parameters. The light guide film 204 may be relatively thin such that the length and width is significantly greater than the thickness in the vertical dimension. In a non-limiting example, the light guide film 204 may have a thickness less than 1 inch, such as less than 0.5 inches; the width between the first and second edges 210, 212 may be greater than 3 feet (36 inches); and the length between the third and fourth edges 214, 216 may be greater than 10 feet (120 inches). Optionally, the light guide film 204 may be configured to be rolled or folded into a smaller size when not installed. The light guide film 204 may be formed or cut into a desired shape and/or size. The light guide film 204 has a solid body that is light transmissive, such as transparent or at least translucent, to enable light to propagate through the interior of the body via total internal reflection. The light guide film 204 may include one or more polymers.

The light guide film 204 is configured to receive light from the light sources 202 into an interior of the light guide film 204 through the first edge 210, and to spread and redirect the light for emitting at least some of that light through the top side 304. Therefore, the light may exit the light guide film 204 through an output surface (e.g., the top side 304) that is orthogonal to the input surface (e.g., the first edge 210) through which the light entered the light guide film 204. The light guide film 204 may have several structural and/or optical features for redirecting the light and/or prohibiting the light from emitting through other surfaces. For example, a reflective layer 308 may be disposed on the bottom side 306 and the second edge 212 of the light guide film 204. Although not shown in FIG. 3, the reflective layer 308 may also be disposed on the third and fourth edges 214, 216 of the light guide film 204. Optionally, all exterior surface of the light guide film 204 may be covered with the reflective layer 308 except for the first edge 210 and the top side 304. The reflective layer 308 is configured to reflect light rays or beams that impinge on the reflective layer 308 back into the interior of the light guide film 204. For example, the beam 300 in FIG. 3 impinges upon the reflective layer 308 along the bottom side 306 and is reflected back towards the top side 304. The reflective layer 308 may resemble a mirror. The reflective layer 308 may be a single, unitary reflective sheet or film that bends around corners of the light guide film 204, as shown in FIG. 3, or may include multiple reflective sheets or films such that the reflective sheet on the bottom side 306 may be discrete from the reflective sheet on the second edge 212.

The light guide film 204 may include an array of deflection elements 312 disposed therein. The deflection elements 312 are located within the interior of the film 204 between the top side 304 and the bottom side 306. Shown in phantom in FIG. 3, the deflection elements 312 are configured to redirect (e.g., spread, scatter, refract, reflect, or the like) the light that propagates through the light guide film 204 such that at least some of the light impinges upon the top side 304 at a sufficient incident angle to be emitted from the top side 304. For example, the deflection elements 312 may reduce the amount or percentage of the beams that merely reflect from the top side 304 back into the light guide film 204 and increase the amount or percentage of beams that refract through the top side 304. The deflection elements 312 may be repeating shapes, such as conical depressions, that are formed or defined within the light guide film 204. The deflection elements 312 may be etched along the top side 304, as shown in FIG. 3, and/or the bottom side 306. Alternatively, the deflection elements 312 may be external features that are embedded within the light guide film 204 during the formation of the light guide film 204, such as a molding process.

The substrate 206 includes a top side 314. In one or more embodiments, the light sources 202 are disposed on the top side 314. The light sources 202 align within the light guide film 204 between the top and bottom sides 304, 306. The light sources 202 are oriented to emit light across the interface 222 into the light guide film 204 through the edge 210 of the light guide film 204. In at least one embodiment, the substrate 206 is flexible. For example, the substrate 206 may represent or include a flexible circuit board, a polymer film, a fabric, or the like. The flexible substrate 206 may enable the entire luminous composite sheet 102 to bend or roll for storage and transportation prior to installation. The light sources 202 are electrically connected to circuit elements on the substrate 206. In a non-limiting example, the circuit elements are conductive metal traces embedded along a flexible circuit board or film, and the light sources 202 may be soldered or otherwise electrically connected to the conductive metal traces. In another non-limiting example, the circuit elements may be conductive materials such as inks that are printed (e.g., screen printed, inkjet printed, atomized jet deposited, paste dispensed, or the like) on a plastic film or fabric. The light sources 202 are powered and controlled via electric current through the circuit elements.

In the illustrated embodiment, the light sources 202 are right-angle, or side-emitting, LEDs. The top side 314 of the substrate 206 is orthogonal (e.g., perpendicular) to the edge 210 of the light guide film 204. The light source 202 is oriented to direct the emitted light in a general direction towards the edge 210. In an alternative embodiment, the light sources may be a traditional, straight, or linear LEDs that are mounted to a surface of the substrate 206 that faces towards the light guide film 204, and the LEDs direct the emitted light generally towards the light guide film 204.

In the illustrated embodiment, the laminate coating 302 covers the top side 314 of the substrate 206 and the top side 304 of the light guide film 204. The laminate coating 302 may fully encapsulate or envelop the substrate 206, the light sources 202, and the light guide film 204. For example, the laminate coating 302 may be thermoset to conform to the shape of the substrate 206, the light sources 202, and the light guide film 204. The laminate coating 302 may structurally secure the substrate 206 to the light guide film 204. In an embodiment, a top surface 322 of the laminate coating 302 is specifically formed to be planar. For example, even when the top side 314 of the substrate 206 is offset vertically from the top side 304 of the light guide film 204, as shown in FIG. 3, the laminate coating 302 is formed to have a planar top surface 322, which defines the user-facing side 110 of the composite sheet 102. For example, the laminate coating 302 has a greater thickness above the substrate 206 than a thickness of the laminate coating 302 above the light guide film 204. During assembly, the substrate 206 does not need to be accurately aligned to the light guide film 204 because slight misalignments can be alleviated by the laminate coating 302.

FIG. 3 shows one of the pressure sensors 208. The pressure sensor 208 may be mounted to the light guide film 204 in order to achieve accurate force measurements of impacts on the carpet 104. For example, the floor lighting assembly 100 may be arranged such that the carpet 104 and the light guide film 204 are disposed within an aisle, and the substrate 206 is disposed outside of the aisle. The substrate 206 may be located below a passenger seat, for example. Mounting the pressure sensors 208 to the light guide film 204 may place the sensors 208 closer to the points of impact than placing the sensors 208 on the substrate 206. In FIG. 3, the pressure sensor 208 is mounted above the top side 304 and is embedded or covered by the laminate coating 302. Alternatively, the pressure sensor 208 may be mounted underneath the reflective layer 308 below the bottom side 306.

The light transmissive carpet 104 is disposed on the top surface 322 of the laminate coating 302. The light transmissive carpet 104 includes a backing structure 330 and a pile 332 mounted to and extending from the backing structure 330. The pile 332 may include strands of yarn, such as in tufts, loops, or knots. The backing structure 330 is light permeable. For example, the backing structure 330 may be translucent to enable light to pass through the backing structure 330. In another example, the backing structure 330 may be opaque and defines holes therethrough such that the holes allow light to pass through the backing structure 330. Optionally, at least some threads or fibers in the yarn of the pile 332 may be unpigmented. The unpigmented fibers may be translucent and may transmit light therethrough similar to a fiber optic wire. The carpet 104 may be installed on the composite sheet 102 via an adhesive (not shown) that secures the top surface 322 of the laminate coating 302 to the backing structure 330. As shown in FIG. 3, the light beam 300 that is emitted through the top side 304 of the light guide film 204 penetrates through the translucent laminate coating 302 and passes through the light transmissive carpet 104 to create a lighting effect on the strands or fibers of the pile 332 which define the user-facing side 112 of the carpet 104.

Figure 4:
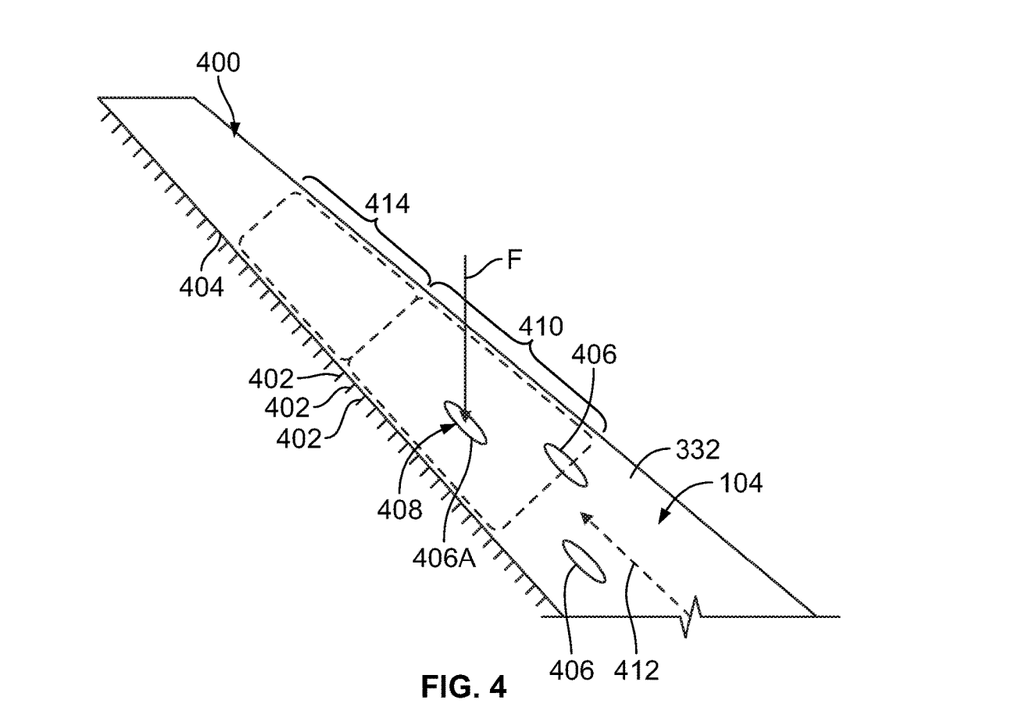
FIG. 4 illustrates an aisle that incorporates the floor lighting assembly according to an embodiment of the present disclosure.

FIG. 4 illustrates an aisle 400 that incorporates the floor lighting assembly 100 according to an embodiment. The aisle 400 may be located in an interior space within a building or a vehicle. Some non-limiting examples of such interior spaces include a passenger cabin of an aircraft, a passenger cabin of a train car, a bus, a movie theater, and an office space within an office building. When the interior space is dimly lit, such as during nighttime, the floor lighting assembly 100 may be used to provide a diffuse glow along the aisle 400. The floor lighting assembly 100 may be configured to enable the entire aisle, 400, or at least a majority of the area of the aisle 400 to glow. The floor lighting assembly 100 may include multiple of the modules shown in FIG. 2 mechanically and electrically connected together in a chain. The illustration in FIG. 4 includes a series of marks 402 along a first edge 404 of the aisle 400 representing positions of the light sources 202 of the lighting assembly 100. The marks 402 are merely included in FIG. 4 for descriptive purposes and would not be actually present along the first edge 404 of the aisle 400. For example, the only portion of the floor lighting assembly 100 that would be visible is the pile 332 of the light transmissive carpet 104.

In at least one embodiment, the controller 108 (shown in FIG. 1) is configured to receive the pressure signals generated by the pressure sensors 208 (shown in FIG. 2). Based on the pressure signals, the controller 108 is configured to detect a presence of one or more bodies on the light transmissive carpet 104. The one or more bodies that are detected may represent any weighted body, living or non-living, that exerts force on one or more of the pressure sensors 208 in excess of a designated threshold value. The bodies may be human, animal, or inanimate objects. In the illustrated embodiment, the body is a human body that is walking along the aisle 400, as indicated by the footprints 406. In FIG. 4, the human is stepping (e.g., applying weight) on the carpet 104 at a location 408 of the footprint 406A. Therefore, a force (F) is being exerted on the floor lighting assembly 100 at the location 408. The controller 108 may detect the presence of the body at the location 408 based on pressure signals received from one or more pressure sensors 208 disposed proximate to the location 408 indicating that the force exceeds the designated threshold force. The threshold may be set such that people weighing at least 35 pounds, for example, walking on the aisle 400 would exceed the threshold and trigger the illumination.

In response, the controller 108 is configured to control the light sources 202 to illuminate an area 410 of the light transmissive carpet 104 that is associated with the location 408. The area 410 is referred to as an occupied area 410 because the area is occupied by the detected body. The occupied area 410 may include and surround the location 408. The occupied area 410 may be illuminated by activating a preset number of light sources 202 in both longitudinal directions from the location 408. In a non-limiting example, the controller 108 may activate five light sources 202 on either side of the light source 202 that best aligns with the detected location 408 of the body to illuminate the occupied area 410. Illuminating the occupied areas 410 provides light to enable the person in the aisle 400 to see objects that may pose a hazard in the dim light.

The occupied area 410 associated with the detected presence of a body may be illuminated with a greater intensity than areas outside of the occupied areas 410 (e.g., non-occupied areas). In one embodiment, the controller 108 may deactivate the light sources 202 as a default mode and only activate the light sources 202 that are used to illuminate the occupied areas 410. Thus, only the light sources 202 used to illuminate the occupied areas 410 may emit light at a given time. In another embodiment, the controller 108 may operate all of the light sources 202 at a first intensity level as a default mode and may illuminate the occupied areas 410 by controlling the relevant light sources 202 to emit light at a second intensity level that is greater than the first intensity level.

Optionally, the controller 108 may be configured to track the location 408 of the presence of the one or more bodies over time based on the pressure signals. For example, the pressure signals may be stored at least temporarily in a memory device that is accessible to the controller 108. Based on the successive locations of a detected body, the controller 108 may be configured to determine movement characteristics of the body, such as a direction of movement 412 of the body relative to the light transmissive carpet 104, a speed of movement of the body, or the like. In the illustrated embodiment, after determining one or more movement characteristics, the controller 108 is configured to control the light sources 202 to illuminate an upcoming area 414 of the light transmissive carpet 104 (e.g., aisle 400) in front of the current occupied area 410 based on the direction of movement 412. As a result, the larger area of the light transmissive carpet 104 is illuminated in front of the current location 408 of the moving body than the area of the carpet 104 that is illuminate behind the location 408 to enable the person to see farther in front while moving along the aisle 400.

Figure 5:
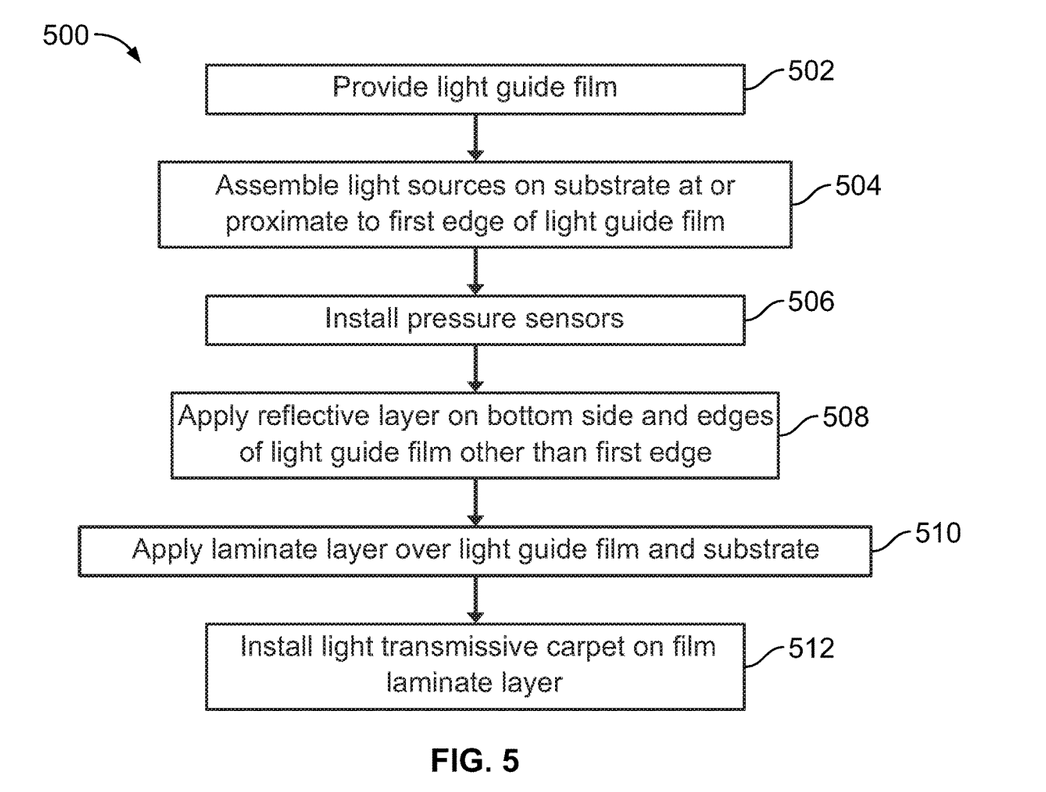
FIG. 5 is a flow chart of a method of producing a floor lighting assembly for an aisle within an interior space of a vehicle or building according to an embodiment of the present disclosure.

FIG. 5 is a flow chart 500 of a method of producing a floor lighting assembly according to an embodiment. The floor lighting assembly produced by the method 500 may be installed within an interior space of a vehicle or building, such as along an aisle or another walkway. The method 500 may produce the floor lighting assembly 100 shown in FIGS. 1 through 4. The method 500 optionally may include more steps than shown in FIG. 5, fewer steps than shown in FIG. 5, different steps than shown in FIG. 5, and/or a different order of the steps than shown in FIG. 5.

At 502, a light guide film 204 is provided that has a top side 304, a bottom side 306 opposite the top side, and an edge 210 extending from the top side 304 to the bottom side 306. The light guide film 204 is configured to receive and propagate light therein through internal reflection. At 504, light sources 202 are assembled in a row 218 at or proximate to the edge 210 of the light guide film 204. The light sources 202 are spaced apart along a length of the light guide film 204 and are oriented to emit light into the light guide film 204 through the edge 210. Optionally, the light sources 202 may be assembled by mounting the light sources 202 along an edge 220 of a substrate 206 that is positioned adjacent to the edge 210 of the light guide film 204. The substrate 206 may be a flexible or rigid substrate.

At 506, a plurality of pressure sensors 208 and a controller 108 may be installed. The pressure sensors 208 are mounted to the light guide film 204. The controller 108 is operably coupled to the pressure sensors 208 and the light sources 202. The pressure sensors 208 may be spaced apart from each other along the length of the light guide film 204. At 508, a reflective layer 308 may be applied on the bottom side 306, a second edge 212, a third edge 214, and a fourth edge 216 of the light guide film 204 to reflect light that impinges thereon back into an interior of the light guide film 204 At 510, a laminate coating 302 is applied to cover a top side 314 of the substrate 206 and the top side 304 of the light guide film 204. A top surface 322 of the laminate coating 302 may be planar.

At 512, a light transmissive carpet 104 is installed on the laminate coating 302, which is above the top side 304 of the light guide film 204. The carpet 104 is installed on the top surface 322 of the laminate coating 302. The light transmissive carpet 104 includes a backing structure 330 and a pile 332 mounted to and extending from the backing structure 330. The backing structure 330 may be made light permeable by defining holes through the backing structure 330 and/or forming the backing structure 330 to be translucent.

Once assembled and installed, the light guide film 204 is configured to spread and redirect the light that is received therein from the light sources 202 such that at least some of the light is emitted through the top side 304 of the light guide film 204. The emitted light may be transmitted through the light transmissive carpet 104 to illuminate the pile 332 of the carpet 104 for providing a diffuse glow, or another lighting effect. Optionally, the controller 108 may be configured to detect a presence of one or more bodies on the light transmissive carpet 104 responsive to pressure signals generated by the pressure sensors 208, and may control the light sources 202 to illuminate an occupied area 410 of the light transmissive carpet 104 that is associated with a location 408 of the detected presence of the one or more bodies.

Figure 6:
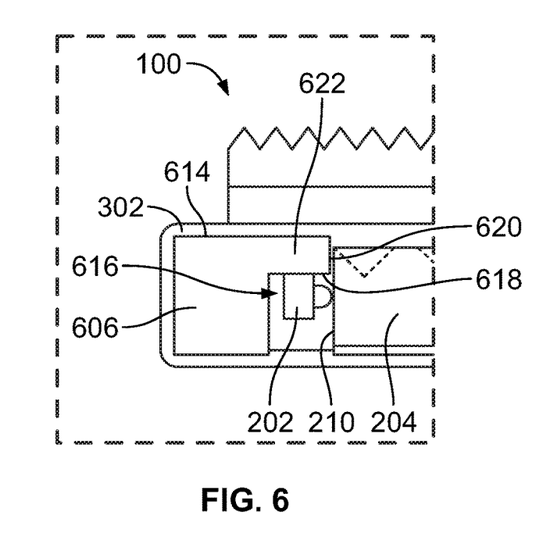

FIG. 6 is a cross-sectional view of a portion of the floor lighting assembly 100 according to an alternative embodiment. The embodiment in FIG. 6 has a different substrate 606 than the substrate 206 shown in FIG. 3. The substrate 606 may define one or more recesses 616 along a light edge 620 that faces the light guide film 204. The light sources 202 are mounted within the one or more recesses 616. For example, the substrate 606 may define a single recess 616 that extends for at least a majority of the length of the substrate 606 in which all of the light sources 202 are disposed. Alternatively, the substrate 606 may define a plurality of individual pocket-like recesses 616 along the length, and each light source 202 is disposed in a different one of the recesses 616. The illustrated light source 202 is mounted to a bottom-facing surface 618 of the substrate 606. The bottom-facing surface 618 is orthogonal (e.g., perpendicular) to the edge 210 of the light guide film 204. The light source 202 in FIG. 6 is a right-angle or side-emitting LED as shown in FIG. 3.

The substrate 606 may include one or more shelves 622 or overhangs that extend over the one or more recesses 616 to protect the light sources 202 within the one or more recesses 616 from impact forces. The one or more shelves 622 have a thickness extending from a top side 614 of the substrate 606 to the bottom-facing surface 618. Forces exerted on the top side 614 of the substrate 606 from people walking on the carpet 104, rolling heavy items along the carpet 104, dropping items on the carpet 104, or the like, may be at least partially absorbed and dissipated by the shelves 622 to reduce the forces exerted on the light sources 202. In an alternative embodiment, the one or more recesses 616 are open along the top side 614, and a thin cover sheet may be mounted above the top side 614 of the substrate 606 to protect the light sources 202, similar to the one or more shelves 622. The cover sheet may be formed of an impact resistant material.

As described above, embodiments of the present disclosure provide systems, assemblies, and methods for efficiently and effectively illuminating an aisle within a dim interior space without disturbing people due to the intensity of the light or causing bumps, ridges, or grooves along the floor. The aisle is illuminated for safety and wayfinding, especially when the interior space is dimly lit or dark, because the illuminated carpet can indicate the presence of objects in the aisle. The floor lighting assembly disclosed herein is efficient because the light sources may only be located along one or more edges of the light guide film instead of having an array of light sources throughout the entire area of the light guide film. Therefore, the floor lighting assembly may desirably include only a limited number of light sources for illuminating a relatively large area of light transmissive carpet. Furthermore, the lighting effect does not disturb people that may be sleeping, reading, or watching a movie because the light is spread by the light guide film and diffused through the carpet, such that no direct light from the light sources is visible. The luminous composite sheet of the floor lighting assembly is designed to emit light through a planar top (e.g., user-facing) surface, such that no bumps, grooves, or other irregularities are formed in the carpet that would indicate that presence of light sources and associated circuitry.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

As used herein, a material or component described using the terms "transparent" or "translucent" means that light can be transmitted through the material and emitted from another side of the material. The term "transparent" indicates a greater amount of light transmittance than the term "translucent," such that a transparent material will have less light distortion, diffusion, and/or attenuation than a translucent material. In this disclosure, the use of the term "translucent" to describe a material or component is not intended, unless explicitly stated, to exclude that the material may also be transparent. For example, a material or component described as "translucent" means that the material or component is at least translucent and may also be (but does not have to be) transparent.

It is to be understood that the processing or control devices described herein, such as the controller 108, may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the processing devices may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only and are thus not limiting as to the types of memory usable for storage of a computer program.

As used herein, the term "controller," "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only and are thus not intended to limit in any way the definition and/or meaning of such terms.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person of ordinary skill in the art to practice the various embodiments of the disclosure, including making and using any devices or systems and performing any incorporated methods. The patentable scope of the various embodiments of the disclosure is defined by the claims, and may include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A floor lighting assembly comprising:
    a luminous composite sheet including a light guide film, a substrate, a translucent laminate coating, and a plurality of light sources, the light guide film having a top side, a bottom side opposite the top side, and an edge extending from the top side to the bottom side, the substrate positioned adjacent to the edge of the light guide film, the light sources mounted on the substrate and arranged in a row at or proximate to the edge of the light guide film, the light sources configured to emit light into the light guide film through the edge, the laminate coating being thermoset to cover and conform to both a top side of the substrate and the top side of the light guide film, wherein a top surface of the laminate coating is planar; and
    a light transmissive carpet disposed on the top surface of the laminate coating, the light transmissive carpet including a backing structure and a pile mounted to and extending from the backing structure,
    wherein the light guide film is configured to spread and redirect the light that is received therein through the edge for emitting the light through the top side of the light guide film such that some of the light is transmitted through the laminate coating and the light transmissive carpet.

2. The floor lighting assembly of claim 1, wherein the light sources in the row are evenly spaced apart along a length of the edge of the light guide film.

3. The floor lighting assembly of claim 1, wherein the light guide film includes an array of deflection elements disposed therein and located between the top side and the bottom side, the deflection elements configured to redirect the light the enters the light guide film through the edge for emitting the light from the top side.

4. The floor lighting assembly of claim 1, wherein the backing structure of the light transmissive carpet is light permeable attributable to one or more of holes defined therethrough or the backing structure being translucent.

5. The floor lighting assembly of claim 1, wherein the light sources are side-emitting light emitting diodes that are mounted to a surface of the substrate that is perpendicular to the edge of the light guide film, the light sources configured to emit light towards the edge.

6. The floor lighting assembly of claim 1, wherein the substrate defines one or more recesses along an edge of the substrate that faces towards the edge of the light guide film, wherein the light sources are mounted within the one or more recesses and the light sources are disposed below the top side of the substrate.

7. The floor lighting assembly of claim 6, wherein the substrate includes one or more shelves that extend over the one or more recesses to protect the light sources within the one or more recesses from impact forces.

8. The floor lighting assembly of claim 1, wherein the light guide film includes a reflective layer on the bottom side thereof to reflect light that impinges upon the bottom side towards the top side.

9. The floor lighting assembly of claim 1, wherein the luminous composite sheet also includes a plurality of pressure sensors mounted to the light guide film and a controller that is operably coupled to the pressure sensors and the light sources, wherein the pressure sensors are spaced apart from each other along a length of the light guide film and the light sources are also spaced apart from each other along the length of the light guide film,
wherein the controller is configured to detect a presence of one or more bodies on the light transmissive carpet responsive to pressure signals generated by the pressure sensors, and is configured to control the light sources to illuminate an occupied area of the light transmissive carpet that is associated with a location of the presence of the one or more bodies.

10. The floor lighting assembly of claim 9, wherein the controller is configured to track the location of the presence of the one or more bodies over time based on the pressure signals to determine a direction of movement of the one or more bodies relative to the light transmissive carpet, the controller further configured to control the light sources to illuminate an upcoming area of the light transmissive carpet in front of the occupied area based on the direction of movement.

11. The floor lighting assembly of claim 1, wherein the laminate coating covers an entirety of the top side of the light guide film.

12. A method comprising:
providing a light guide film having a top side, a bottom side opposite the top side, and an edge extending from the top side to the bottom side;
assembling a plurality of light sources on a substrate positioned adjacent to the edge of the light guide film, the light sources spaced apart along a length of the substrate and oriented to emit light into the light guide film through the edge;
applying a translucent laminate coating to cover and conform to both a top side of the substrate and the top side of the light guide film, wherein a top surface of the laminate coating is planar; and
installing a light transmissive carpet on the top surface of the laminate coating, the light transmissive carpet including a backing structure and a pile mounted to and extending from the backing structure,
wherein the light guide film is configured to spread and redirect the light that is received therein through the edge for emitting the light through the top side of the light guide film such that some of the light is transmitted through the laminate coating and the light transmissive carpet.

13. The method of claim 12, wherein assembling the light sources on the substrate includes mounting the light sources within one or more recesses defined along an edge of Hall the substrate that faces the edge of the light guide film, wherein the light sources within the one or more recesses are disposed below the top side of the substrate.

14. The method of claim 13, wherein the light sources are mounted in the one or more recesses such that one or more shelves of the substrate extend over the one or more recesses between the light sources and the laminate coating to protect the light sources within the one or more recesses.

15. The method of claim 12, further comprising making the backing structure of the light transmissive carpet light permeable by one or both of defining holes through the backing structure or forming the backing structure to be translucent.

16. The method of claim 12, further comprising installing a plurality of pressure sensors mounted to the light guide film and a controller that is operably coupled to the pressure sensors and the light sources, wherein the pressure sensors are spaced apart from each other along the length of the light guide film, and wherein the controller is configured to detect a presence of one or more bodies on the light transmissive carpet responsive to pressure signals generated by the pressure sensors, and is configured to control the light sources to illuminate an occupied area of the light transmissive carpet that is associated with a location of the presence of the one or more bodies.

17. The method of claim 16, wherein the controller is configured to track the location of the presence of the one or more bodies over time based on the pressure signals to determine a direction of movement of the one or more bodies relative to the light transmissive carpet, the controller further configured to control the light sources to illuminate an upcoming area of the light transmissive carpet in front of the occupied area based on the direction of movement.

18. The method of claim 12, wherein the edge of the light guide film is a first edge and the light guide film also includes a second edge opposite the first edge, a third edge that extends between the first edge and the second edge, and a fourth edge opposite the third edge, the method further comprising:
applying a reflective layer on the bottom side, the second edge, the third edge, and the fourth edge of the light guide film to reflect light that impinges thereon back into an interior of the light guide film.

19. A floor lighting assembly comprising:
a luminous composite sheet including a light guide film, a substrate, a plurality of light sources, and a laminate coating, the light guide film having a top side, a bottom side opposite the top side, and an edge extending from the top side to the bottom side, the substrate positioned adjacent to the edge of the light guide film, the substrate defining recesses along an edge of the substrate that faces the edge of the light guide film, the substrate including shelves that extend over the recesses, the light sources mounted on the substrate within the recesses and arranged in a row along the substrate, the light sources configured to emit light into the light guide film through the edge thereof, the laminate coating covering a top side of the substrate, including the shelves, and the top side of the light guide film, wherein a top surface of the laminate coating is planar; and
a light transmissive carpet disposed on the top surface of the laminate coating, the light transmissive carpet including a backing structure and a pile mounted to and extending from the backing structure,
wherein the light guide film is configured to spread and redirect the light that is received therein through the edge for emitting the light through the top side of the light guide film such that some of the light is transmitted through the laminate coating and the light transmissive carpet.

20. The floor lighting assembly of claim 19, wherein the laminate coating is thermoset to conform to both the top side of the substrate and the top side of the light guide film, and the laminate coating covers an entirety of the top side of the light guide film.

\* \* \* \* \*

UNITED STATES PATENT AND TRADEMARK OFFICE
CERTIFICATE OF CORRECTION

PATENT NO. : 10,921,511 B1
APPLICATION NO. : 16/563360
DATED : February 16, 2021
INVENTOR(S) : Jeffrey Lynn Duce and Karen L. Hills Page 1 of 1

It is certified that error appears in the above-identified patent and that said Letters Patent is hereby corrected as shown below:

In the Claims

In Claim 13, Line 3 (Column 15, Line 67): delete "Hall".

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*